United States Patent [19]

Divine et al.

[11] 4,028,684
[45] June 7, 1977

[54] MEMORY PATCHING CIRCUIT WITH REPATCHING CAPABILITY

[75] Inventors: Charles Hamman Divine, Thornton; John Christian Moran, Broomfield, both of Colo.

[73] Assignee: Bell Telephone Laboratories, Incorporated, Murray Hill, N.J.

[22] Filed: Oct. 16, 1975

[21] Appl. No.: 622,940

[52] U.S. Cl. .......................................... 340/172.5
[51] Int. Cl.$^2$ .................................... G06F 13/00
[58] Field of Search ............................... 340/172.5

[56] References Cited
UNITED STATES PATENTS

3,934,227  1/1976  Worst ........................... 340/172.5

*Primary Examiner*—Gareth D. Shaw
*Assistant Examiner*—C. T. Bartz
*Attorney, Agent, or Firm*—Donald M. Duft

[57] ABSTRACT

A ROM patching facility is disclosed which permits any ROM address location containing defective information to be patched. New and updated program information is supplied to the system upon the detection of each address word that is to be patched. The disclosed equipment repatches one or more times a ROM address that has already been patched. Upon the detection of each such address, the program information associated with the most recent implemented patch is returned to the system. The disclosed equipment comprises a plurality of PROM decoders for detecting ROM addresses that are to be patched and for generating output signals representing each patched address, encoders for receiving the decoder output signals and for encoding each such signal into binary address information, and auxiliary memories controlled by the encoder address information for providing valid program information to the system upon each detection of a patched ROM address.

15 Claims, 5 Drawing Figures

| PATCH NO. | ADDRESS BITS A3 A2 A1 A0 | PROM 1 OUTPUT BITS 7 6 5 4 3 2 1 0 |
|---|---|---|
| 0 | 0 0 0 1 | 0 0 0 0 0 0 0 1 |
| 1 | 0 0 1 1 | 0 0 0 0 0 0 1 0 |
| 2 | 0 0 1 0 | 0 0 0 0 1 1 0 0 |
| 3 | 0 0 1 0 | 0 0 0 0 1 1 0 0 |
| 4 | 0 1 1 1 | 1 0 0 1 0 0 0 0 |
| 5 | 0 1 1 0 | 0 0 1 0 0 0 0 0 |
| 6 | 1 0 0 1 | 0 1 0 0 0 0 0 0 |
| 7 | 0 1 1 1 | 1 0 0 1 0 0 0 0 |

FIG. 4

| PATCH NO. | ADDRESS BITS A7 A6 A5 A4 | PROM 2 OUTPUT BITS 7 6 5 4 3 2 1 0 |
|---|---|---|
| 0 | 0 0 1 0 | 0 0 0 0 0 0 0 1 |
| 1 | 0 1 1 0 | 0 0 0 0 0 0 1 0 |
| 2 | 0 1 0 0 | 0 0 0 0 0 1 0 0 |
| 3 | 0 0 0 1 | 0 0 0 0 1 0 0 0 |
| 4 | 1 1 1 0 | 1 0 0 1 0 0 0 0 |
| 5 | 1 1 0 0 | 0 0 1 0 0 0 0 0 |
| 6 | 0 0 1 1 | 0 1 0 0 0 0 0 0 |
| 7 | 1 1 1 0 | 1 0 0 1 0 0 0 0 |

FIG. 5

| PATCH NO. | ADDRESS BITS A11 A10 A9 A8 | PROM 3 OUTPUT BITS 7 6 5 4 3 2 1 0 |
|---|---|---|
| 0 | 0 1 0 0 | 0 0 0 0 0 0 0 1 |
| 1 | 1 1 0 0 | 0 0 0 0 0 0 1 0 |
| 2 | 1 0 0 0 | 0 0 0 0 0 1 0 0 |
| 3 | 0 0 1 0 | 0 0 0 0 1 0 0 0 |
| 4 | 1 1 1 1 | 1 0 0 1 0 0 0 0 |
| 5 | 1 0 0 1 | 0 0 1 0 0 0 0 0 |
| 6 | 0 1 1 0 | 0 1 0 0 0 0 0 0 |
| 7 | 1 1 1 1 | 1 0 0 1 0 0 0 0 |

MEMORY PATCHING CIRCUIT WITH REPATCHING CAPABILITY

BACKGROUND OF THE INVENTION

1. Field of the Invention

This invention relates to a patching facility for unalterable memories of the type used in electronic computers and processors. More particularly, the invention relates to a memory patching facility which furnishes good output information whenever an attempt is made to access word locations containing defective or invalid information in an unalterable memory. 2. Description of the Prior Art It is known to use unalterable read only memories (ROMs) in processors, computers, and other such applications requiring the storage of permanent type information. Although ROMs, in particular semiconductor ROMs, are efficient unalterable information storage devices, their use presents problems whenever it becomes necessary to change the stored information. For example, a machine using a ROM may be manufactured, tested, delivered, installed in service, and perform satisfactorily for an extended period of time. A machine malfunction may subsequently occur because of defective program information in the ROM. This defective information may be due either to a subtle defect in the program as originally written; or it may result from a newly developed defect within the ROM device.

In view of the above, it is a common problem for program errors to be discovered in ROM controlled machines and for the owner of the machine to be faced with the problem of promptly correcting the error to minimize the machine downtime.

This problem could be easily solved if the realities of semiconductor ROM technology and economics were of no concern. Conceivably, the problem could be solved by replacing the defective ROM with a new ROM programmed with the correct information. However, this solution is neither feasible nor economical. First of all, the typical semiconductor ROM can only be programmed at the factory with the programming comprising a portion of the manufacturing process. Consequently, a machine user cannot promptly obtain a newly programmed ROM. Instead, he must contact the ROM manufacturer, give the manufacturer the corrected program information, and then wait for the manufacturer to produce and deliver the new ROM. Also, because the ROM programming is done by the manufacturer on a customized basis, a manufacturer cannot economically produce one or two new ROMs for a single customer. ROM's are economical only when fabricated in reasonably large quantities. For these reasons, the downtime of a machine cannot normally be minimized by replacing a defective ROM with a new one having corrected program information.

Field programmable ROMs (PROMs) are commercially available for immediate delivery. Conceivably, an installed machine having a defective ROM could be returned to service by programming a PROM with good information, and by then replacing the defective ROM with the newly programmed PROM. This would be technically feasible, but economically unsatisfactory, for most applications. The reason for this is that PROM devices are approximately ten times the cost of comparable ROMs. This expedient might be satisfactory, in spite of the economic penalty, in installations where the cost of the PROM is low compared to the cost of the user of the down condition of the machine. However, many installations could not tolerate the cost penalty. For example, a telephone company or a computer manufacturer having thousands of machines in service possibly could not afford the mass replacement of defective ROMs wth PROMs costing ten times as much.

Attempts have been made in the prior art to solve the problem of defective information in unalterable memories. Most of the prior art solutions require the use of equipment that is complicated and expensive, such as the provision of a fully duplicated memory system. One prior art arrangement comprises a decoder which detects the receipt of each memory address word specifying a defective ROM location, generates a control signal to inhibit the output of the defective ROM, and activates an alterable auxiliary memory which then supplies valid program information. A system of this type is shown in U.S. Pat. No. 3,638,194 issued on Jan. 25, 1972 to Matushita et al.

Matushita uses a diode matrix array as the auxiliary memory. This memoiy can be field programmed by inserting diodes into sockets of the matrix crosspoints required to generate the new program information. The Matushita system may be suitable for use in application where space is not at a premium and where the ROM is of limited capacity. However, it is unsuitable with present state of the art systems using integrated circuits including ROMs and other such devices of the postage stamp size where space is at a premium. Also, the Matushita arrangement would be costly for use with a large capacity ROM since the auxiliary memory presumably would have to have the same bit capacity as the defective ROM. In this case it would merely comprise another duplicated memory arrangement.

It is therefore, a problem to maintain program controlled machines in service when program defects are discovered in the ROMs of such machines.

SUMMARY OF THE INVENTION

OBJECTS

An object of the invention is to provide memory patching facilities for stored program controlled machines using ROMs.

A further object is to provide memory patching facilities which are activated to output good information whenever ROM word locations containing defective information are addressed.

SUMMARY DESCRIPTION

The present invention comprises a ROM patching facility which permits any ROM address location containing defective information to be patched. New and updated program information is supplied to the system by the patching facility upon the detection of each address word that is to be patched. The invention further comprises a facility for repatching one or more times, a ROM address that has already been patched. Upon the detection of each such address, the program information associated with the most recent implemented patch is returned to the system. The invention comprises a plurality of PROM decoders for detecting ROM addresses that are to be patched and for generating output signals representing each patched address, encoders for receiving the decoder output signals and for encoding each such signal into binary address information, and auxiliary memories controlled by the encoder address information for providing valid program information to the system upon detection of a patched ROM address.

A copending concurrently filed application in the name of J. C. Moran, Ser. No. 623,133, filed Oct. 16, 1975, disclosed a ROM patching facility. The equipment provided by Moran includes a PROM decoder for detecting the receipt of address words representing defective ROM locations and for generating an output signal identifying each such address word, a small capacity auxiliary memory for storing the valid program information that is to be used in place of that in the defective ROM locations, and an encoder interposed between the decoder and the auxiliary memory for addressing the memory whenever a decoder output is received identifying a ROM location that is to be patched.

Inputs of the Moran decoder and the ROM are both connected to the memory address bus of the system of which the ROM is a part. The decoder receives each address word applied to the ROM, identifies each received word that represents a defective ROM location and generates an output signal unique to the defective location. This signal is in 1-out-of-$n$ form and it is applied to the one of the plurality of decoder output conductors that is associated with the patched address. Each decoder output conductor represents a different defective ROM location that is to be patched. The encoder receives this 1-out-of-$n$ signal, converts to binary and transmits the binary information to the auxiliary memory as address information. This information is used to specify the word location in the auxiliary memory that stores the valid program information that is to be used in place of that in the defective ROM location.

The encoder also generates a gating control signal whenever an output signal is received from the decoder. This gating signal inhibits the output of the ROM and activates the output of the auxiliary memory so that the good information stored in the auxiliary memory will be used by the system at this time in place of that defective ROM location.

Moran uses a plurality of small capacity PROMs to decode the ROM address information on the multiconductor system address bus and to provide a unique output signal for each detected ROM address word associated with a defective ROM location that is to be patched. Let it be assumed that there are 12 conductors in the system address bus extending to the inputs of the ROM. In this case, one possible embodiment of the Moran invention could comprise three 16 × 8 PROMs in the decoder to provide eight patches i.e., facilities for detecting eight different ROM address words representing eight defective ROM locations. The term 16 × 8 specifies that each PROM has sixteen different eight bit word locations.

Each such PROM, as shown by Moran, has four address inputs with each input being connected to a different conductor of the 12 bit system address bus. The four inputs of the first PROM are connected to the first four address bus conductors, the four inputs of the second PROM are connected to the next four address bus conductors, and the four inputs of the third PROM are connected to the last four bus conductors. Each PROM stores 8 bit words, each PROM has eight output conductors, and each one of the eight output conductors of each PROM are wired in parallel to the corresponding output conductors of the other PROMs.

PROM 1, the first PROM, is programmed so that a 1 is written into the first bit position of the word location in the PROM that is addressed by bits 0 through 3 of the address of the first ROM word to be patched. Likewise, a 1 is written into the first bit position of the word location in PROM 2 that is addressed by bits 4 through 7 of the address of the first ROM word to be patched. This procedure is repeated with respect to PROM 3 using address bus bits 8 through 11.

The operation of the Moran circuit is such that all PROMs output an 8 bit word having a 1 in the same bit position or order whenever the address of a ROM location to be patched is received from the system address bus. Each output bit corresponds to one possible patch and the paralleled PROM outputs provide a 1-out of-8 code identifying each patch. The paralleling of the corresponding output conductors of each PROM comprises a hardwired AND circuit so that each paralleled output conductor can go high only when a 1 appears in the corresponding bit position of each PROM for the currently addressed word. With this arrangement, when the first patched ROM address appears on the system address bus, all three PROM's will have a 1 in the first or last significant bit position, the output conductor for this bit position in each PROM will go high, and this high signal will signify the reception of the first patched address word.

Each decoder output signal in the Moran system is applied in 1-out of-8 form to the encoder and converted into a 3-bit binary word. The binary word is then applied as address information to the auxiliary memory to specify the word location in the memory that is to be used at this time in place of the defective information in the ROM.

When a ROM address which has not been patched is received, the paralleled PROM outputs in the Moran system are zero for all bit positions or orders since, at this time, a 1 does not appear in any of the corresponding bit orders for all of the PROMs. This holds all of the 8 paralleled decoder output conductors at a low or 0 potential and indicates that the received address word has not been patched. The system then uses the information stored in the currently addressed ROM location.

Although the Moran arrangement represents a significant advancement in the art of patching defective ROM locations, the number of patches that it can provide is defined or limited by the number of binary bits (the bit width) of each PROM, rather than by the number of word locations in the PROMs. For example, Moran's use of three 16 × 8 PROMs limits the number of patches to eight since each PROM word is eight bits wide. The capacity of the Moran patching arrangement could be increased only by increasing the bit width of the PROMs and not by the use of PROMs having a greater number of word locations. However, increasing the bit widths of the PROMs would also entail increasing the capacity of the encoder so that it could provide extra bits of address information to the auxiliary memory. Although it is possible to increase the capacity of the Moran patching arrangement in this manner, it would be expensive and would require the use of many parts and components that are different from the basic patching arrangement of Moran's which provides only eight patches.

The Moran system is further limited in that it permits a given ROM address to be patched only once. Experience regarding the operation of ROM controlled systems has shown that it is often desirable to patch a given ROM address a plurality of times. This capability is useful for a number of reasons. First of all, the first patch may itself be defective or present unanticipated difficulties. Secondly, the system requirements may change and, in turn, require a change in the patched information.

The present invention comprises a ROM patching facility which is similar to Moran's but which provides additional patching capacity as well as the capability of permitting a given ROM addressed to be patched a plurality of times. This is accomplished by providing a plurality of interconnected patching circuits. Each patching circuit is somewhat similar to Moran's and comprises a PROM decoder, a priority type encoder, as well as with an auxiliary memory. Each priority encoder operates in a manner similar to Moran's encoder which, as will be recalled, receives 1-out of-8 type decoder output signals representing defective ROM addresses, and encodes each signal it receives into a 3-bit binary address word which is applied to the auxiliary memory. The priority encoders of the present invention operate in this manner whenever they receive 1-out of-8 type signals. However, our priority encoders have the additional capability that they can concurrently receive a plurality of input signals, respond to only one of the signals, and encode only it into binary for use by the auxiliary memory.

The input terminals of each priority encoder are numbered 0 through 7. This, of course, assumes the use of PROM decoders of the type shown by Moran which store words having an 8-bit width. The internal circuitry of each encoder functionally arranges the input terminals in a hierarchy with terminal 0 having the lowest priority and with terminal 7 having the highest priority. The encoder responds to a signal on a particular input terminal only if a signal is not concurrently received by a higher numbered terminal. Conversely, an input signal on a higher numbered terminal inhibits the encoder's response at that time to any signal concurrently received on any lower numbered input terminal.

The use of a priority encoder enables a single patching circuit to patch a given ROM address a plurality of times. For example, a ROM address may be initially patched by programming the decoder PROMs to apply a signal to output conductor 0 of the decoder upon the detection of this address. When this address is subsequently detected, a 0 in 1-out of-8 form is applied to the encoder, is encoded into binary, and is transmitted as address information to the auxiliary memory which then outputs the good program information the system then requires.

Subsequently, this same ROM address may be repatched by programming the same decoder PROMs to apply a signal to output conductors 7 upon the detection of this ROM address. From then on, whenever this ROM address is received, the decoder PROMs apply signals to both their output conductors 0 and 7, and these two signals are concurrently applied to inputs 0 and 7 of the priority encoder. The priority encoder disregards the signal it receives on input terminal 0 and responds only to the signal it receives on its input terminal 7. It encodes this 7 into binary and applies it to the auxiliary memory which then outputs the updated information the system requires at this time as a substitute for both that provided by the first patch as well as for that in the defective ROM location.

The provision of a plurality of patching circuits in accordance with the present invention permit additional ROM locations to be patched or repatched. The priority encoders of all patching circuits are arranged in a hierarchy with the encoder of circuit 0 being of the lowest priority and with the encoders of the higher numbered patching circuits being of correspondingly higher priority. Let it be assumed that there are 8 patching circuits numbered 0 through 7. The priority encoders are interconnected between patching circuits in such a manner that the receipt of a decoder signal by the encoder of an intermediate patching circuit inhibits the operation of the encoders of all lower numbered circuits whenever any one of these simultaneously receives a signal from its decoder PROMs. Let it be assumed that the priority encoder for circuit 7 receives a signal from its decoder PROMs at the same time the encoder for circuit 0 receives a signal from its decoder. The reception of the decoder signal by the encoder of circuit 7 generates the required binary address signals so that its auxiliary memory can return good program information back to the system in place of that in the defective ROM location being patched. This priority encoder also generates an inhibit signal which is applied to the encoders of all lower numbered patching circuits to inhibit them from responding to any signals they then may concurrently receive from their decoder PROMs. This inhibits the encoder of circuit 0 and prevents it and its auxiliary memory from transmitting and program information at that time back to the system.

The provision of the plurality of groups of patching facilities comprises what may be termed a two level repatching facility or capability. First of all, a given ROM address may be patched one or more times by the decoder PROMs and priority encoder of single patching circuit; secondly, this same ROM address may then be repatched additional times by the decoder PROMs and priority encoders of the higher numbered patching circuits. The latest implemented patch is the one that is recognized as long as each subsequent repatch is implemented by a decoder PROM location having a higher priority than any priorly implemented patch or repatch of the same ROM address.

Features

A feature of the invention is the provision of a ROM patching facility which uses a plurality of small capacity decoder PROMs, priority encoders, and auxiliary memories, to permit a defective ROM address location to be patched a plurality of times with the program information associated with the most recently implemented patch being returned to the system upon each detection of the defective ROM address on a system address bus.

A further feature is the provision of a plurality of interconnected patching circuits arranged in a numbered hierarchy whereby the detection of a ROM address that is to be patched by the decoder of a higher numbered circuit inhibits the operation of all lower numbered circuits so that only the program information generated by the higher numbered circuit is returned to the system.

Another feature is the provision of a plurality of interconnected patching circuits each of which comprises a plurality of small capacity PROMs to detect address words representing defective ROM address locations, PROM decoder circuitry for generating at least one distinctive output signal whenever an address word is detected representing a defective ROM location that is to be patched, a priority encoder which receives each decoder output signal and which encodes each such signal into a binary word representing address information for an auxiliary memory.

A further feature is that the auxiliary memory in each patching circuit stores the valid program information that is to be used when a defective ROM address word is received and that the auxiliary memory is addressed by the information applied to it by the encoder.

A further feature is the provision of control circuitry including each priority encoder which responds to the reception of an output signal from its decoder and which, at that time, inhibits the output of the defective ROM and substitutes the currently addressed information in its auxiliary memory.

A further feature is that each priority encoder can concurrently receive a plurality of separate signals from its decoder PROMs on a corresponding plurality of separate input conductors, respond to only the signal on the most preferred one of the conductors, and encode only it into binary for use by an associated auxiliary memory.

A further feature is the provision of control circuitry comprising the interconnected priority encoders of the plurality of patching circuits whereby the concurrent detection of a ROM address that is to be patched by a plurality of patching circuits will activate only a most preferred one of the circuits and cause only it to return valid program information to the system.

Description of the Drawing

These and other objects, advantages, and features of the invention may be more readily understood upon a reading of the following description of an exemplary embodiment of the invention taken in conjunction with the drawing in which.

Description

Figure 1:
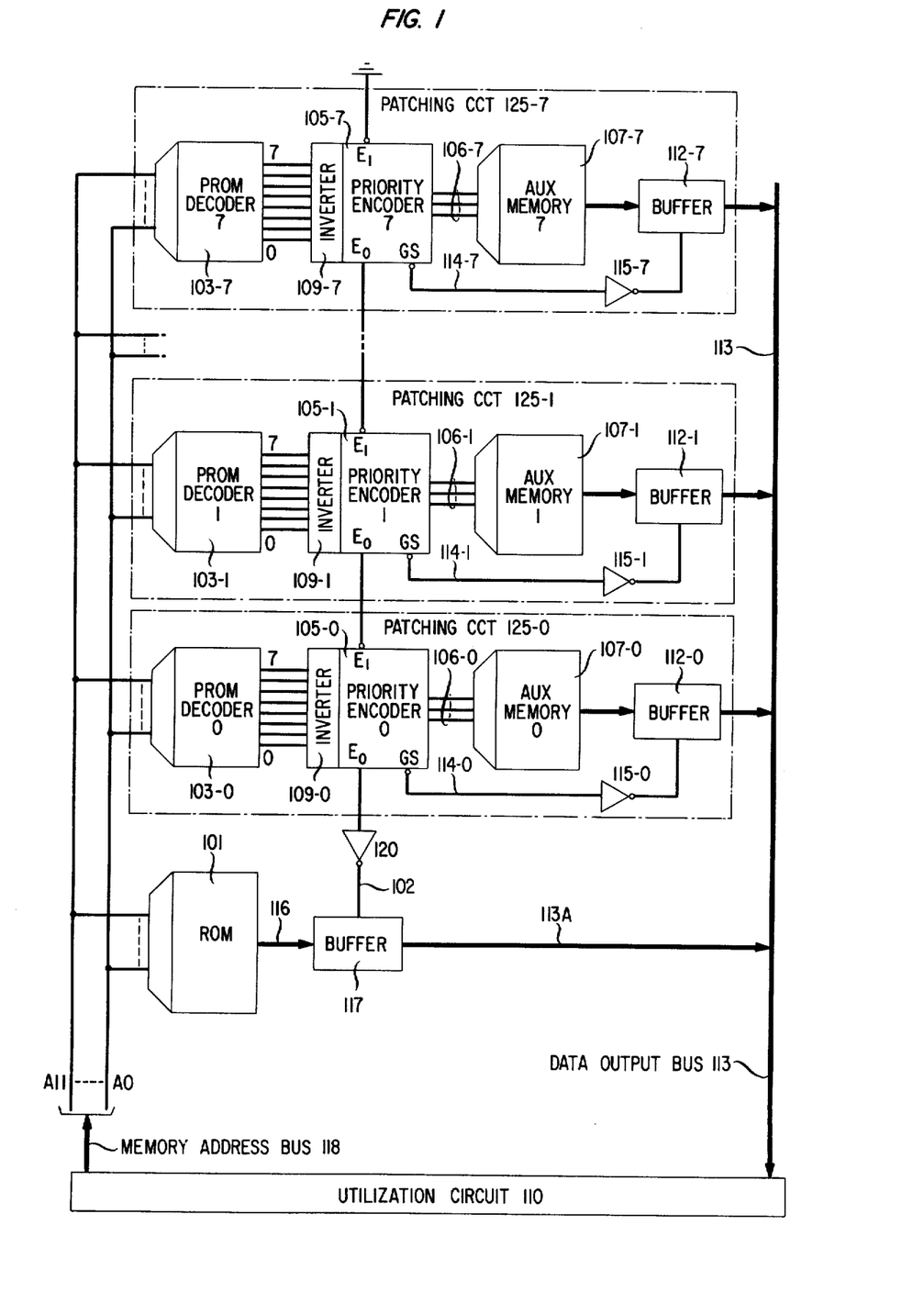
FIG. 1 discloses one possible embodiment of the invention which provides facilities for 64 patches.

A memory system embodying the invention is shown on FIG. 1 as comprising a memory address bus 118, a ROM 101 which is the main memory of the system and which is assumed to have the defective locations that are to be patched, a buffer 117 which receives the output signals from the ROM, and an output bus 113 which receives the ROM output signals via buffer 117 and extends them to the utilization circuit 110. Circuit 110 may comprise the remainder of the system elements, including a processor, that are associated with and/or controlled by the memory system of FIG. 1.

In normal operation, the utilization circuit 110 applies address word information to the ROM via the memory address bus 118 and, in return, receives the contents of each word read out of the ROM. This information is received from the ROM via path 116, buffer 117, path 113A and the data output bus 113. Buffer 117 is normally enabled by a high on its control conductor 102. During such times, the buffer effectively interconnects paths 116 and 113A signalwise.

The embodiment of the invention shown on FIG. 1 further includes a plurality of patching circuits 125-0 through 125-7. Each patching circuit includes a PROM decoder 103, a priority encoder 105 having an inverter 109, an auxiliary memory 107, a buffer 112, and an inverter 115. The inputs of each PROM decoder are connected to the conductors of address bus 118, and the circuit elements within each patching circuit 125 function to detect the appearance on bus 118 of each ROM address word that is to be patched, and apply to bus 113 the valid program the system requires as a substitute for the invalid information stored in the defective ROM location being patched.

Figure 2:
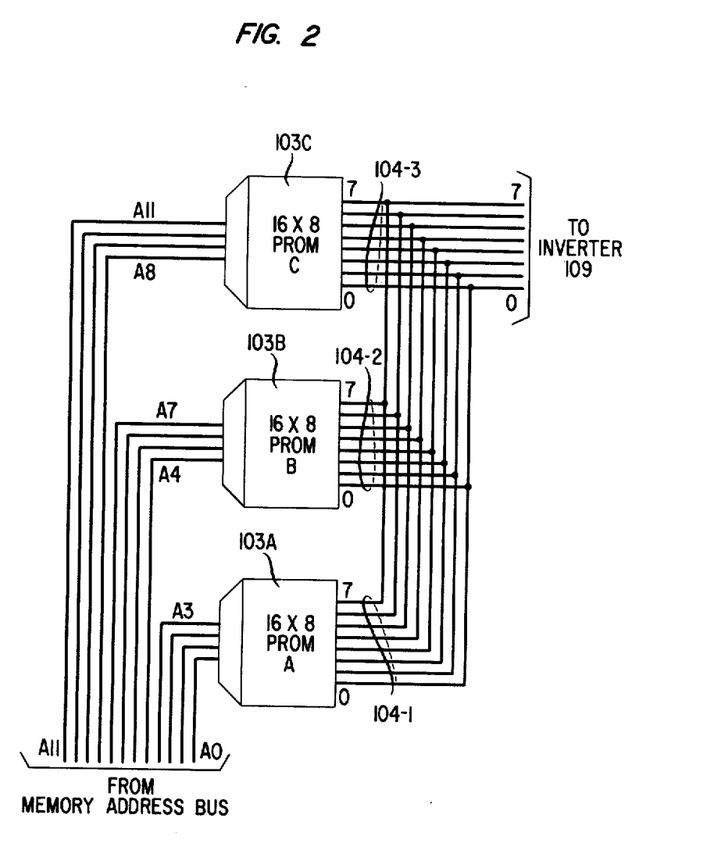
FIG. 2 discloses additional details of PROM decoders of FIG. 1.

FIG. 2 illustrates the details of one possible embodiment of a single PROM decoder 103 of FIG. 1. Each such decoder includes three 16 X 8 PROMs 103A, 103B, and 103C. Each PROM has four address inputs with the inputs of PROM A being connected to address conductors A0 through A3, the inputs of PROM B being connected to address conductors A4 through A7, and the address inputs of PROM C being connected to address conductors A8 through A11. Each PROM stores 8-bit words, each PROM has eight output conductors designated 0 through 7, the corresponding output conductors of the three PROMs are connected in parallel with each other, and they extend to a different input on encoder 105 via inverter 109. Each PROM output conductor is uniquely associated with a unique bit order within its PROM. For example, PROM output conductors 0 are associated with the rightmost, the lowest, bit order so that when any PROM word is read out, the contents of the rightmost bit of the word being read out are applied to output conductor 0.

As is subsequently discussed in connection with FIG. 3, 4, and 5, the three PROMs of FIG. 2 together are programmed to detect eight different ROM address words on bus 118. Each set of paralleled output conductors of the PROMs is functionally associated with one of the address words on bus 118 that can be patched. Thus, output conductor 0 is functionally associated with the address of the first word that is to be patched, and a binary 1 is written into the rightmost bit of the word location in each PROM that is accessed when the first patched address word appears on bus 118. Consequently, whenever this word is received, a binary 1 is read out of the rightmost bit of each PROM and is applied to paralleled output conductors 0.

The corresponding output conductors of the three PROMs of a set are wired in parallel and the internal circuitry of the PROMs is such that a set of paralleled output conductors can go high only when each PROM drives its output conductor high in response to the storage of a binary 1 in the associated bit order of the word being read out. A binary 0 (a low) read out on an output conductor of one PROM will hold the corresponding output conductors of the other two PROMs low even though these other two PROMs currently read out a 1.

In this manner, output conductor 0 of each of the three PROMs of FIG. 2 is associated with a first ROM word that is to be patched. The other seven PROM output conductors may be associated up to seven other ROM words that can be patched. The patching capacity of this arrangement is therefore limited to 8 ROM address words since each PROM has eight output conductors.

From the above, it can be seen that a set of three PROMs generates 1-out of-8 type information when a patched address is received. Each 1-out of-8 signal represents one of the patched address that can be detected by the PROMs. The associated encoder 107 receives each decoder output signal, encodes it into binary, and applies the binary information as address bits to the auxiliary memory 107 which may be a PROM. These three address bits uniquely identify the patched address and they address the word in memory 107 that contains the valid program information that is to be used at this time as a substitute for that in the currently addressed defective ROM location.

The preceding has described how the three PROMs comprising a single decoder as shown on FIG. 2 may be programmed to detect up to eight different ROM address words that are to be patched. In such cases, the PROMs detect the patched address and apply a 1-out of-8 type signal to their paralleled output conductors uniquely identifying the patched address.

Alternatively, a set of PROMs comprising a single decoder of the type shown in FIG. 2 may be programmed to patch and then repatch the same ROM address one or more times. Thus, the PROMs may be initially programmed to detect a given ROM address with their rightmost bit position and, accordingly, to apply a 1-out of-8 type signal to output conductor 0 whenever this address is detected. Six other ROM addresses may be then subsequently patched by programming the PROMs to apply a signal to one of conductors 1 through 6 whenever any of these other six addresses are detected. Subsequently, it may be desired to re-patch the first patch, namely the one associated with output conductor 0. In this case, the PROMs are programmed with a 1 in the leftmost bit position of the word in each PROM that is accessed by the corresponding bits of the defective ROM address. After this patch is implemented, the detection of this address by the three PROMs causes an output signal to be applied to both conductors 0 and 7. These two signals are concurrently applied to inputs 0 and 7 of the associated priority encoder. The input circuitry of the priority encoder causes the encoder to respond to only the signal on the most preferred input terminal. The encoder thus responds to only the signal on terminal 7, it encodes this signal into a binary 7 and applies it to the auxiliary memory. The memory now returns to the system the valid program information it requires as a substitute both for that in the defective ROM location as well as that in the location of the auxiliary memory associated with patch 0 which has now been repatched by patch 7.

Each encoder 105 has a GS output terminal which is normally high but which goes low whenever the encoder receives a high from its decoder PROMs on any of its inputs 0 through 7. The low on terminal GS is applied over conductor 114 to inverter 115 which applies a high to buffer 112 to enable it. This causes the auxiliary memory output signals on path 111 to be extended through buffer 112 to data output bus 113. Terminal Eo of an encoder is normally low but goes high when a patch signal is received by the encoder. This high is inverted by element 120 and applied as a low to buffer 117. This inhibits it and prevents the defective information in the patched ROM location from being applied to the system via bus 113.

With reference to the above, let it be assumed that the first word that can be patched by patching circuit 125-0 is applied to the address bus 118. The bits of this word specify the location in each of the PROMs of decoder 103-0 that has a binary 1 stored in its rightmost bit. Each PROM 103-0 now reads out a binary 1 to drive its output conductor 0 high. This high is extended to the input 0 of priority encoder 105-0. The encoder encodes this signal into a binary 0 which is applied over conductors 106-0 to the auxiliary memory 107-0. This accesses the location in the memory that stores the good information the utilization circuit 110 requires at this time in place of that in the defective location of ROM 101. The low on terminal GS of encoder 105-0 is inverted by circuit 115-0 which applies a high to buffer 112-0 to enable it so that the valid program information read out of the auxiliary at this time may be applied to data output bus 113. The Eo terminal of the encoder 105-0 goes from a low to a high when the encoder receives a signal from the decoder. This high is inverted by element 120 which applies a low to buffer 117 to disable it and prevent the valid program information in the ROM from being applied to bus 113.

The preceding has described how patching circuit 125-0 detects a ROM address that is to be patched and, in turn, how it generates and applies valid program information to the system in response to the detection of the patch. The remaining patching circuits operate in a similar manner in response to the detection of other ROM address that are to be patched. For example, let it be assumed that the last patching circuit, circuit 125-7, detects a ROM address that is to be patched. The elements within this patching circuit operate in exactly the same manner as that described for the first patching circuit. The only exception is that the high on terminal Eo of the priority encoder 105-7 is propagated downward through the priority encoders of the other patching circuits until it appears as a high on terminals $E_1$ and Eo of encoder 105-0. This high is then inverted by element 120 and applied as a low to buffer 117 to disable it and prevent the output of the ROM from being applied to data output bus 113.

The above description of FIG. 1 has described how a ROM address that has been patched only once may be detected by a single patching circuit and how that patching circuit, in turn, generates valid program information in response to the detection of the patched address. Each patching circuit operates in an analogous manner in the event that its decoder PROMs have been programmed to initially patch and then repatch a single ROM address. In this case, the detection of the repatched ROM address causes the associated PROM decoder to apply output signals to two of its output conductors (assuming the address has been repatched only once) with these two signals being extended to the inputs of the priority encoder. The priority encoder recognizes only the signal applied to its highest numbered input terminal, it encodes only this signal into binary, and applies it to the auxiliary memory which then functions in the same manner as already described.

Let it next be assumed that a given ROM address has been initially patched by a first patching circuit, such as a circuit 125-0, and has then been subsequently repatched by the appropriate programming of the PROMs of another patching circuit, say circuit 125-7. The subsequent detection of this ROM address by the circuitry of FIG. 1 causes an output signal to be generated by both PROM decoders 103-0 and 103-7. Both decoders, apply a signal to the appropriate input of their associated priority encoder and each encoder, in turn, encodes this signal into binary and applies it to its auxiliary memory. Thus, both auxiliary memories 107-0 and 107-7 receive address information at this time from their priority encoders and both memories output program information to their associated buffer 112. Buffer 112-0 receives the program information associated with the first implemented path for this ROM address. Buffer 112-7 receives the program information associated with the most recently implemented repatch of this same address. The program information received by buffer 112-0 is assumed either to be outdated or invalid and, therefore, it is desired that the system receive only the program information applied to buffer 112-7.

Terminal Eo of priority encoder 105-7 goes high when it receives a patch signal from its decoder. This high is propagated downward through the other priority encoders and is applied to the $E_1$ terminal of priority encoder 105-0. This high on terminal $E_1$ drives terminal Eo of the encoder high and at the same time, drives terminal GS of the encoder high. This high prevents the GS terminal from going low as it otherwise would if it did not receive a high on its $E_1$ terminal. This high is inverted by element 115-0 and applied as a low to buffer 112-0. This inhibits the buffer and prevents the program information now being read out of auxiliary memory 107-0 from being applied to data bus 113.

The reception of the match signal by priority encoder 105-7 drives its GS terminal low since terminal $E_1$ of the encoder is low. This low on terminal GS is inverted by element 115-7 to a high and applied to buffer 112-7. This activates the buffer and permits the program information now being read out of auxiliary memory 107-7 to be applied to data output bus 113 and in turn being extended to the utilization circuit 110.

Thus, the detection of the same ROM address by both patching circuits causes both of their auxiliary memories to generate program information and apply this information to their associated buffers 112. However, only the buffer of patching circuit 125-7 is activated and, therefore, only the program information read out of the auxiliary memory of that patching circuit is returned to the system. The information read out of the auxiliary memory of patching circuit 125-0 is not returned to the system since the high appearing on terminal Eo of priority encoder 105-0 effectively disables all of the remaining patching circuits by disabling their priority encoders. The disabling of priority encoder 105-0 maintains a high on its GS terminal which is inverted to a low to disable its buffer 112-0 so that the program information read out of its auxiliary memory 107-0 cannot be applied over bus 113 to the system.

In summary, the circuitry of FIG. 1 provides two level patching and repatching facilities. First of all, a single ROM address may be patched and repatched by the decoder PROMs of a single patching circuit and the provided circuitry operates to apply to the system only the information associated with the most recently implemented patch. Secondly, the plurality of patching circuits as shown on FIG. 1 permits a single ROM address to be patched by a single patching circuit and then subsequently, to be repatched one or more times by one or more of the remaining patching circuits. The system of FIG. 1 operates in such a manner that only the program information associated with the most recently implemented patch is applied to data bus 113 and returned to the system.

Figure 3:
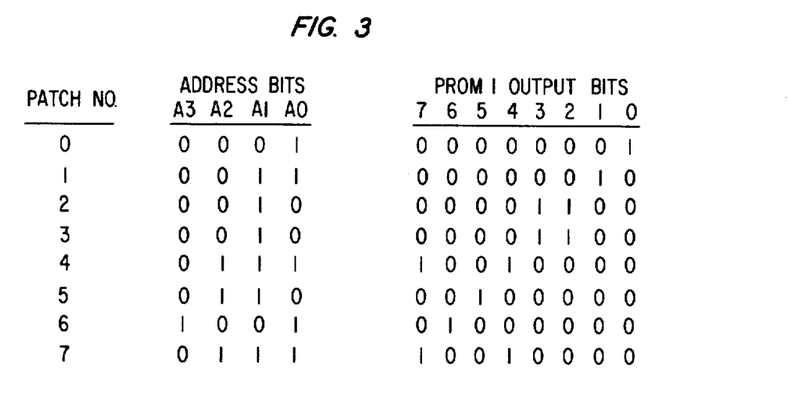
FIG. 3 through 5 disclose one possible manner in which one group of the decoder PROMs of FIG. 1 could be programmed.
Figure 4:
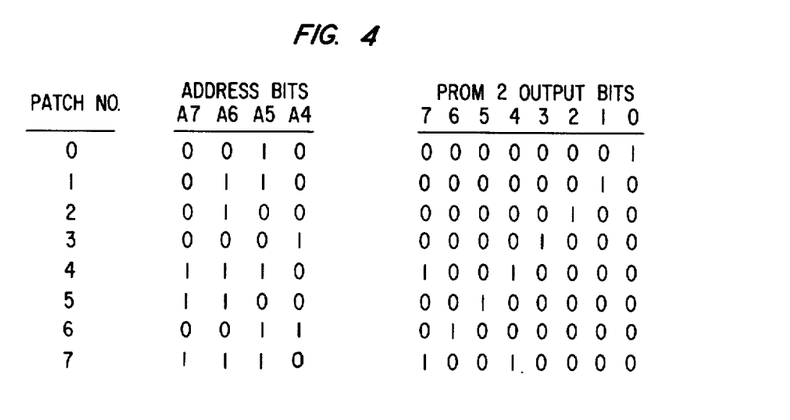
Figure 5:
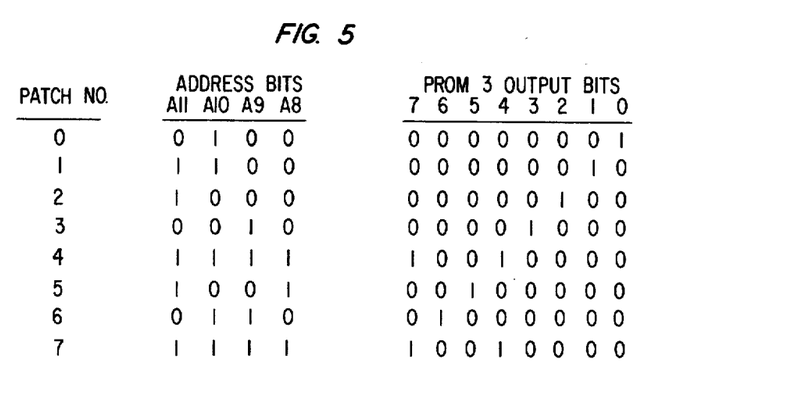

FIGS. 3, 4, and 5 together illustrate the manner in which a set of three PROMs 103-A, B, C comprising a single decoder 103 could be programmed to provide seven different patches and one repatch. The left column of each FIG. specifies the patch number, the middle column indicates the address bus bits received by each PROM for each patch, the right column indicates the manner in which the PROMs are programmed to generate the patch signals.

With reference to FIG. 3, which illustrates the programming for PROM A, it can be seen that the PROM A location associated with patch 0 is accessed upon the receipt of the binary bits 0001. From the right column of FIG. 3 it can be seen that a binary 1 is written in the rightmost bit of this word. On FIG. 4 it can be seen that the PROM B location associated with patch 0 is accessed by the binary bits 0010 and that a binary 1 is stored in the rightmost bit position of this word. On FIG. 5 it can be seen that the PROM C word associated with patch 0 is accessed by the address bits 0100 and that a binary 1 is stored in the rightmost bit of this word. A binary 1 is applied by each PROM to its output conductor 0 when the address bits for patch 0 are received by the three PROMs. This drives the paralleled output conductors 0 high, and this high extends into input conductor 0 of the priority encoder where it is encoded into binary and subsequently used as address information by auxiliary memory 107.

The remaining lines of FIGS. 3, 4, and 5 illustrate the manner in which the PROMs are programmed to generate patch information for other defective ROM address locations.

A PROM location may be programmed to have a binary 1 in a plurality of bit positions if the address bits that access this PROM word are associated with a plurality of ROM addresses to be patched. This is illustrated on FIG. 3 for patches 2 and 3. The address bits received by PROM A for both of these patches is 0010 and a binary 1 is written into bit positions 2 and 3 of the PROM location accessed by bits 0010. The address bits applied to PROMs B and C are different for patches 2 and 3 and, therefore, different ROM word locations are patched even though the same four bits (AO – A3) are applied to PROM A for both of these patches.

FIGS. 3, 4, and 5 illustrate with respect to patches 4 and 7 how a given ROM address may initially be patched and may then be subsequently repatched. It may be seen from an inspection of these three figures that each of the three PROMs receives identical address information for both patches 4 and 7. It may further be seen from the right hand column on each of these figures that a 1 is programmed into both the 4th and the 7th bit orders of the PROM word in each PROM that is accessed by the address information associated with patches 4 and 7.

It is necessary that the patches are implemented into the PROMs time wise beginning with patch 0 and extending upwards numerically. This being the case, at a first given instant of time the three PROMs could be programmed to provide seven different patches numbered 0 through 6. With respect to patch 4, this patch initially would be implemented by inserting a 1 into bit order 4 of the word location in each PROM that is accessed by the address bits applied to each PROM as shown for patch 4 on FIGS. 3, 4, and 5. From then on, the subsequent detection of the patch 4 address word would cause each of the three PROMs to apply a 1 to their output conductor 4 and this, in turn, would cause a 1 to be applied in 1-out of-8 form to input terminal 4 of the associated priority encoder.

Subsequently, the program information generated by the auxiliary memory for patch 4 may be defective or, alternatively, the system requirements associated with the patch 4 information may change. At that time, the patch 4 information may be repatched by using the patch 7 capability of each PROM and by inserting a 1 into the bit order of each PROM location addressed by the patch 4 address bits. From then on, the detection of the ROM address word heretofore exclusively associated with patch 4 will cause the PROMs to apply 1s to both their output conductors 4 and 7. The associated priority encoder will then concurrently receive a 1 on both of its input terminals 4 and 7. The priority encoder responds only to the signal received on its highest numbered input terminal and encodes only it into binary for use by the auxiliary memory. The word location in the auxiliary memory accessed by the binary 7 received from by the encoder, in the meantime, will have been programmed to generate the valid program information the system requires at this time in place of both that in the defective ROM location being patched as well as that in the word location associated with patch 4 memory 107.

The PROM programming of FIGS. 3 through 5 is merely illustrative of the capabilities of the embodiment of the invention of FIG. 1. In particular, it illustrates typical programming for one set of decoder PROMs. Other sets could be programmed in any manner desired. It should be appreciated that the PROMs of any set may be programmed in any manner desired to provide the required patch and repatch facilities.

The three PROMs 103- and the auxiliary memory 107 may be IM5160 type devices. They are field programmable. The encoders 105, may be TI SN 74148 type devices. The inverters 109, may be SN 7406 devices.

The PROMs apply a high potential to their output conductors to indicate an active state, the encoder responds to a low as an active signal. In order to make the PROMs and the encoder compatible, the inverter 109 is shown and its sole function is to invert the highs representing active output PROM signals to the lows required by the encoder. The inverter may be a TI SN 7406 type device. This inverter is shown as part of the encoder since it is of no significance to the present invention other than to make the PROM output signals compatible with the encoder.

What is claimed is:

1. A circuit for patching and repatching defective word locations of an unalterable memory (ROM) containing invalid information with said circuit being responsive to the receipt of address words specifying said defective ROM locations, said circuit comprising; an alterable memory (PROM) decoder having inputs for receiving said ROM address words, a plurality of outputs on said decoder, means in said decoder for associating said each one of said defective ROM locations with different ones of said outputs with the address word for at least one of said locations being associated with a plurality of said outputs, said decoder being responsive to the receipt of the address word specifying said one defective ROM location for applying a patch signal to each of said outputs associated with said word for said one location, a priority encoder having inputs arranged in a predetermined order of preference with each input being individually connected to a different one of said decoder outputs, said encoder being responsive to the simultaneous receipt of a patch signal on a plurality of said inputs for encoding only the patch signal on the most preferred one of said inputs that receives a patch signal into address information, an auxiliary memory, and means for applying said encoded address information to said auxiliary memory for generating valid program information as a substitute for that stored in said one defective ROM location.

2. The circuit of claim 1 in which said decoder comprises; a plurality of alterable memories (PROMs) having input conductors each of which receives the bit for a different bit order of said ROM address words, each bit of said address words being unique to a single input of a single PROM, a plurality of output conductors on each of said PROMs with each conductor being unique to a different bit order within a PROM, means for connecting in parallel the output conductors representing corresponding bit orders for each of said PROMs, each set of said paralleled output conductors forming one of said decoder outputs, and means in said PROMs for associating the address words for said defective ROM locations with different sets of said paralleled output conductors with at least one of said ROM address words representing a defective location being associated with a plurality of said sets, said PROMs being jointly responsive to the receipt of each address word specifying a defective ROM location to apply a patch signal to each set of paralleled output conductors associated with said specified defective location.

3. The circuit of claim 2 wherein said circuit further comprises; means for applying each address word to said ROM to read out the ROM program information associated with each applied word, means for normally applying the program information read out of said ROM to a data output bus, means responsive to a patch signal for applying the output information generated by said auxiliary memory to said data output bus, and further means responsive to said patch signal for preventing said ROM from applying to said output bus the invalid information in said currently addressed defective ROM location.

4. A circuit for patching and repatching $j$ defective word locations of an unalterable memory (ROM) containing invalid information with said circuit being responsive to the receipt of $n$ times $m$ bit ROM address words specifying said defective locations, said circuit comprising; $n$ alterable memories (PROMs) each having at least $m$ input conductors with each conductor receiving the bit for a different bit order of said address words, each of said address word bit orders being unique to a single input of a single PROM, $j$ output conductors on each of said PROMs each of which is unique to a different bit order within a PROM, means for forming $j$ sets of output conductors by connecting in parallel the output conductors representing corresponding bit orders for each of said PROMs, means in said PROMs for associating the different address words representing defective ROM locations with different ones of said sets of said paralleled output conductors with the address word for at least one of said defective locations being associated with a plurality of said sets, said PROMs being jointly responsive to the receipt of each address word specifying a defective location to apply a patch signal to each set of paralleled output conductors associated with the address word for said specified location, a priority encoder having inputs arranged in a predetermined order of preference with each input being connected to a different individual one of said sets of decoder output conductors, said encoder being responsive to the simultaneous receipt of a patch signal on a plurality of said sets for encoding only the patch signal on the most preferred one of said inputs that receives a patch signal into address information, an auxiliary memory, and means for applying said encoded address information to said auxiliary memory for generating valid program information as a substitute for that stored in the currently addressed defective ROM location.

5. The combination of an unalterable memory (ROM) having at least *j* different defective word locations containing invalid program information, and a circuit for patching and repatching said *j* defective locations in response to the receipt of ROM address words specifying said locations, said combination comprising; an address bus having at least *n* times *m* conductors which are connected to address inputs of said ROM, control means for applying address words to said bus representing locations of said ROM containing program information that is to be read out, means for receiving the program information read out of each ROM location and for normally extending said information over a data bus to said control means, *n* alterable memories (PROMs) each having at least *m* address inputs, means for connecting each conductor of said address bus to a different input on said PROMs whereby each bus conductor is connected to a single input of a single PROM, *j* output conductors on said PROMs each of which correponds to a different bit order within a PROM, means for forming *j* sets of output conductors by connecting in parallel the output conductors representing corresponding bit orders for each of said PROMs, means in said PROMs for associating the address words for different ones of said defective locations with different sets of said paralleled output conductors with the word for at least one of said defective locations being associated with a plurality of said sets, said PROMs being jointly responsive to the receipt of an address word specifying a defective ROM location to apply a patch signal to each set of said paralleled output conductors associated with said specified location, a priority encoder having inputs arranged in a predetermined order of preference with each input being individually connected to a different one of said decoder output conductors, said encoder being responsive to the simultaneous receipt of a patch signal on a plurality of said inputs for encoding only the patch signal on the most preferred one of said inputs that receives a patch signal into address information, an auxiliary memory, means for applying said encoded address information to said auxiliary memory for generating valid program information as a substitute for that stored in the currently addressed defective ROM location, and means for extending said valid information to said control means.

6. The combination of claim 5 wherein said combination further comprises; means responsive to said patch signal for applying the output information from said auxiliary memory to said data output bus extending to said control means, and further means responsive to said patch signal for preventing said ROM from applying to said data bus the invalid information in said currently addressed defective location.

7. A system for patching and repatching defective word locations of an unalterable memory (ROM) containing invalid information with said system being responsive to the receipt of ROM address words specifying said defective locations, said system comprising; a plurality of patching circuits arranged in a predetermined order of preference, means for applying each ROM address word to each of said circuits, means for associating the address words for different ones of said defective locations with different ones of said circuits with at least one of said address words for a defective location being associated with a plurality of said circuits, means in each circuit responsive to the receipt of ROM address word associated with said circuit and specifying a defective location for generating valid program information as a substitute for that in said specified location, and means responsive to the receipt of a ROM address word associated with a plurality of said circuits for enabling only the most preferred one of said circuits receiving said word to generate valid program information.

8. The system of claim 7 in combination with; means for applying each address word to said ROM to read out the ROM program information associated with each applied word, means for normally applying the program information read out of said ROM to a data output bus, means responsive to each patch signal for applying the output information generated by one of said patching circuits to said data output bus, and further means responsive to said patch signal for preventing said ROM from applying to said output bus the invalid information in said currently addressed defective ROM location.

9. The system of claim 8 in which each of said patching circuits comprises; an alterable memory (PROM) decoder having inputs for receiving said ROM address words, a plurality of outputs on said decoder, means in said decoder for associating the address words for different ones of said defective ROM locations with different ones of said outputs with the address word for at least one of said locations being associated with a plurality of said outputs, said decoder being responsive to the receipt of an address word specifying said one defective ROM location for applying a patch signal to each of said outputs associated with said one location, a priority encoder having inputs arranged in a predetermined order of preference with each input being individually connected to a different one of said decoder outputs, said encoder being responsive to the simultaneous receipt of a patch signal on a plurality of said inputs for encoding only the patch signal on the most preferred one of said inputs that receives a patch signal into address information, an auxiliary memory, and means for applying said encoded address information to said auxiliary memory for generating valid program information as a substitute for that stored in said one defective ROM location.

10. The system of claim 9 in which said decoder comprises; a plurality of alterable memories (PROMS) having input conductors each of which receives the bit for a different bit order of said address words, each bit order being unique to a single input of a single PROM, a plurality of output conductors on each of said PROMs each of which is unique to a different bit order within a PROM, means for connecting in parallel the output conductors representing corresponding bit orders for each of said PROMs, each set of said paralleled output conductors forming one of said decoder outputs, means in said PROMs for associating the address words for different ones of said defective ROM locations with different sets of said paralleled output conductors with at least one of said ROM address words representing a defective location being associated with a plurality of said sets, said PROMs being jointly responsive to the receipt of each address word specifying a defective ROM location to apply a patch signal to each set of paralleled output conductors associated with the address word for said specified defective location.

11. The system of claim 9 in which said preference arrangement of said patching circuits comprises; a preference input terminal and a preference output terminal on each patching circuit, each encoder of a circuit being responsive to a patch signal from its decoder for applying an inhibit signal to the preference output terminal of its patching circuit, means for connecting the preference input terminal of each patching circuit to the preference output terminal of the next most preferred patching circuit, each patching circuit also being effective to extend to its preference output terminal any inhibit potential received on its preference input terminal, and means including each encoder being effective upon the concurrent reception of an inhibit potential from the next preferred circuit and a patch signal from its decoder for preventing the auxiliary memory of the same patching circuit from applying generated information to said output bus.

12. The method of patching and repatching defective word locations of an unalterable memory (ROM) containing invalid information upon the receipt of address words specifying said defective ROM locations, said method comprising the steps of;
 applying each received address word to inputs of an alterable memory (PROM) decoder,
 associating different ones of said defective ROM locations with different outputs of said decoder with at least one of said locations being associated with a plurality of said outputs, said decoder being responsive to the receipt of an address word specifying said one defective ROM location for applying a patch signal to each of said outputs associated with said one location,
 applying each patch signal to a priority encoder having inputs arranged in a predetermined order of preference with each input being connected to a different individual one of said decoder outputs, said encoder being responsive to the simultaneous receipt of a patch signal on a plurality of said inputs for encoding only the patch signal on the most preferred one of said inputs receiving a patch signal into address information, and
 applying said encoded address information to an auxiliary memory to generate valid program information as a substitute for that stored in said one defective ROM location.

13. The method of claim 12 in combination with the additional steps of;
 applying each address word to said ROM to read out the ROM program information associated with each applied word,
 normally applying the program information read out of said ROM to a data output bus,
 applying the output information generated by said auxiliary memory to said data output bus, and
 preventing said ROM under control of said patch signal from applying to said output bus the invalid information in said currently addressed defective ROM location.

14. The method of patching and repatching $j$ defective word locations of an unalterable memory (ROM) containing invalid information upon the receipt of $n$ times $m$ bit ROM address words specifying said defective locations, said method comprising the steps of;
 applying each address word to $n$ alterable memories (PROMs) each having at least $m$ input conductors each of which receives the bit for a different bit order of said address words, each of said bit orders being unique to a single input of a single PROM,
 forming $j$ sets of output conductors by connecting in parallel the output conductors representing corresponding bit orders for each of said PROMs with each PROM having $j$ orders,
 associating the ROM address words representing different ones of said defective ROM locations with different ones of said sets of said paralleled output conductors with the address word for at least one of said defective locations being associated with a plurality of said sets, said PROMs being jointly responsive to the receipt of each address word representing a defective location to apply a patch signal to each set of paralleled output conductors associated with the address word for said specified defective location,
 applying each patch signal to a priority encoder having inputs arranged in a predetermined order of preference with each input being connected to a different individual one of said sets of decoder output conductors, said encoder being responsive to the simultaneous receipt of a patch signal on a plurality of said sets for encoding only the patch signal on the most preferred one of said inputs receiving a patch signal into address information, and
 applying said encoded address information to an auxiliary memory for generating valid program information as a substitute for that stored in said one defective ROM location.

15. A method of operating a memory system with said method comprising the steps of;
 applying address words to an $n$ times $m$ bit address bus with each word representing an unalterable memory (ROM) location containing program information that is to be read out of said ROM, some of said ROM locations being defective because of containing invalid information,
 reading program information out of said ROM upon the reception of each address word,
 extending the program information read out of said ROM over a data output bus to a system control,
 applying each address word received by said address bus to $n$ alterable memories (PROMs) each having at least $m$ address input conductors with each conductor receiving the bit for a different bit order of said address words, each bit order being unique to a single input of a single PROM,
 forming sets of output conductors by connecting in parallel the PROM output conductors representing corresponding bit orders in each of said PROMs,
 associating the address words for the different ones of said defective locations with different sets of said paralleled output conductors with the word for at least one of said defective locations being associated with a plurality of said sets, said PROMs being jointly responsive to the receipt of an address word specifying a defective ROM location to apply a patch signal to each set of said paralleled output conductors associated with said specified location,
 applying each patch signal to a priority encoder having inputs arranged in a predetermined order to preference with each input being individually connected to a different one of said decoder outputs, said encoder being responsive to the simultaneous receipt of a patch signal on a plurality of said inputs for encoding only the patch signal on the most preferred one of said inputs that simultaneously receives a patch signal into address information, applying said encoded address information to said auxiliary memory for generating valid program information as a substitute for that stored in said one defective ROM location, extending said valid information to said control means, and preventing said ROM under control of said patch signal from applying to said output bus the invalid information in said currently addressed ROM location.

* * * * *